June 30, 1942.  G. F. FELTON  2,288,442
DEVICE FOR CLAMPING FISHING RODS AND THE LIKE
Filed May 5, 1941
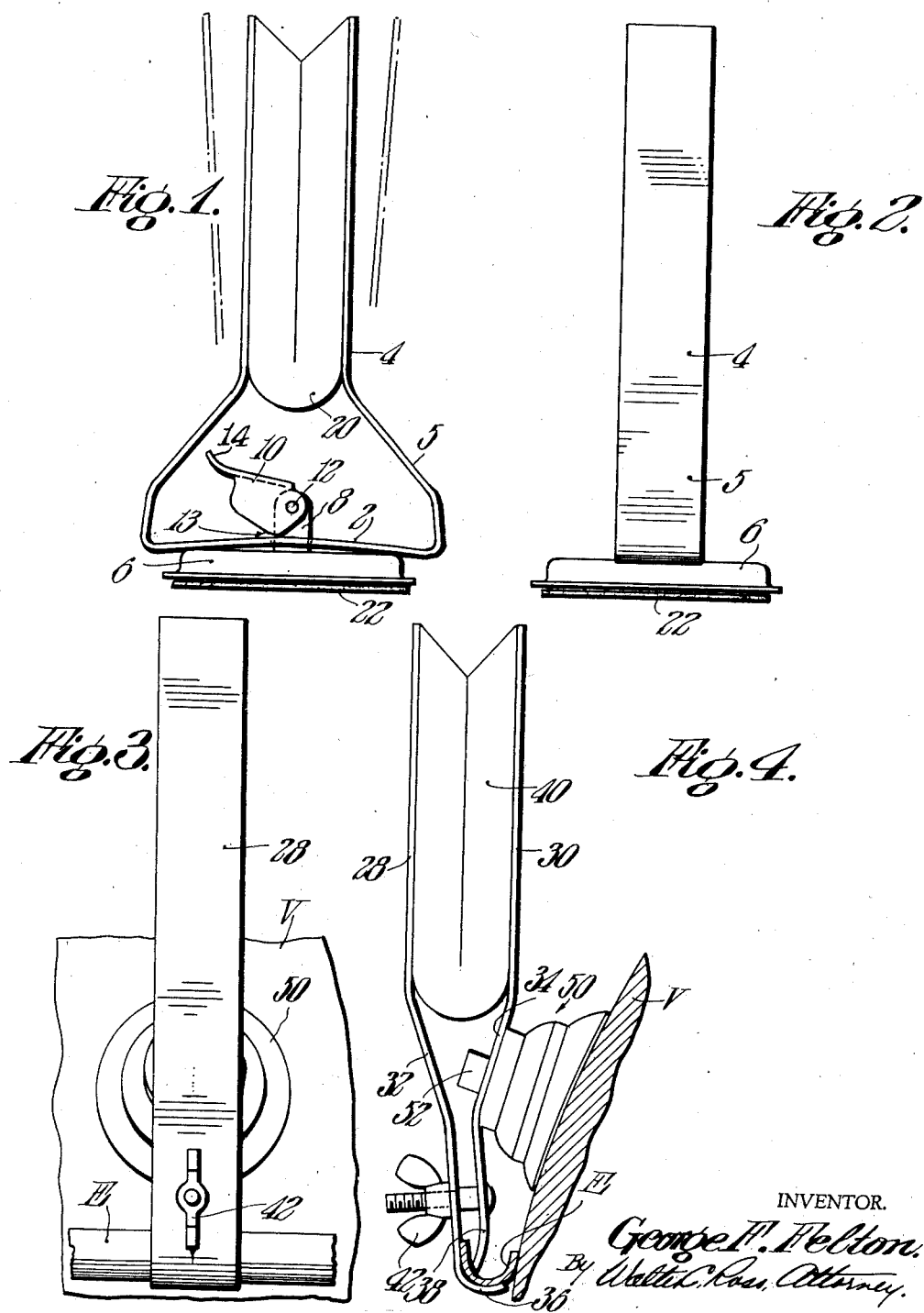
INVENTOR.
George F. Felton.
By Walter C. Ross, Attorney.

Patented June 30, 1942

2,288,442

UNITED STATES PATENT OFFICE 2,288,442

DEVICE FOR CLAMPING FISHING RODS
AND THE LIKE

George F. Felton, Millers Falls, Mass.

Application May 5, 1941, Serial No. 392,015

3 Claims. (Cl. 248—229)

This invention relates to improvements in clamping devices and is more particularly directed to the provision of a novel device for clamping a fishing rod or the like in such a way that the same is safely supported for carrying, storage, or other purposes.

It is a principal object of the invention to provide a device which is capable of being removably attached to such a movable object as an auto body, for example, or to a relatively stationary wall, such as that of a garage. As special features, the device includes a pair of relatively yieldable arms which preferably are cushioned and between which the fishing rod is held.

A further object of the invention is the provision of a simple yet efficient clamping device which is easy and economical to manufacture. As will appear, the various parts are capable of ready assembly and the clamping action is easily adjustable.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Fig. 1 is a side elevational view of one form of a device embodying the features of the invention;

Fig. 2 is an end elevational view of what is shown in Fig. 1;

Fig. 3 is an end elevational view showing a modified form of the device of the invention as it appears attached to an object; and Fig. 4 is a side elevational view of the form shown in Fig. 3 with the object in section.

Referring now to the drawing more in detail, the invention will be fully described.

A body 2 is provided and this has a pair of spaced arms 4 extending upwardly or outwardly therefrom with offset portions 5 therebetween. The arms are adapted to be urged towards one another into clamping relation and while this may be accomplished in various ways, a simple and inexpensive way is to have the arrangement shown.

The body 2 is bowed upwardly, or outwardly away, from a support 6 to which it is attached by a connecting member 8. According to the form shown, the member 8 has its lower end fixed in part 6 and its upper end portion extends upwardly through an opening provided in part 2.

The connecting member 8 has a cam member 10 pivoted thereto as by a pin 12. Said member 10 has a cam surface 13 for engaging member 2 and there may be a manually-engageable part 14 to facilitate swinging or moving of member 10 on its pivot.

As will be appreciated, when the cam member is moved in one direction it engages the part 2 in such a way that it is what may be called "unbowed." That is, it flattens out from the position shown in Fig. 1 so that the arms 4 are moved inwardly towards one another under spring-tension.

According to Figs. 1 and 2, the body 2 and arms 4 are formed from a bent, unitary and flat strip of spring metal. The arms are capable of being manually urged apart, as is indicated by the dot-dash lines in Fig. 1, but will tend to move towards one another when released. As stated, of course, the action of the cam member in any event will move the strips 4 closer together.

The inner faces of the arms 4 are preferably cushioned. This may be done in various ways but according to the preferred form it is accomplished by use of a length of so-called sponge rubber 20 which is folded into U-shape.

The pad 20 is disposed between the arms with the open end of the U uppermost, of course, to permit entrance of the article to be clamped.

The outer surfaces of the arms of the U-cushion may be secured to the arms 4 in any suitable way as by adhesive.

It is desirable that some means be provided to permit ready and removable attachment of the device to some surface, such as a part of an automobile, a wall of a barn or garage, or the like. To this end, I have provided a suction cup 22 on the lower or outer side of support 6.

This may be of conventional form but, it will be understood, when the device is pressed firmly against a desired surface with the cup 22 adjacent thereto, the device becomes releasably attached in place.

According to the modification shown in Figs. 3 and 4, there are arm members 28 and 30 having main body parts spaced and lower end portions offset inwardly towards one another as at 32 and 34. The lower end of one of the arm members, such as member 28, is turned inwardly to provide a lip 36, while the lower end of member 30 is turned inwardly at 38.

With this arrangement, the lip 36 may engage the underside of an eaves-trough E of a vehicle V while the part 38 engages its upper side. It will be appreciated that if the end portions of the arm members are urged towards one another, the eave E is firmly gripped between them.

One way in which the arm members may be urged towards one another is to provide a threaded bolt which extends through the arms with a wing-nut 42 in threaded engagement therewith. As the nut is rotated in one direction, the arms are moved together while rotation in an opposite direction will release the pressure.

A suction-cup device, indicated generally by 50, may be secured to the arm member 30 by a bolt 52. With the parts arranged as shown, the cup 50 may engage the part of the vehicle body V which is just above the eave and thereby co-operate with the eave-binding parts to hold the device firmly in place.

A cushion member 40, which is preferably U-shaped similar to the part 20, may be secured to the inner sides of arms 28 and 30. Thus, the arms may be spread apart to receive the butt-end ends of a fishing-rod or rods and, when released, the cushion will yieldingly yet firmly embrace it or them.

Preferably the outer ends of the U-shaped cushions 20 and 40 are formed to present a Y at the open end of the U. This facilitates ready insertion of the rod, pipe, or whatever object is to be clamped since the user need only press the object downwardly in the groove and it easily finds its position between the body parts of the cushion without requiring the arms to be manually spread apart.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. As a new article of manufacture, a clamping device of the class described comprising in combination, a support, a pair of relatively movable and substantially parallel arm members attached thereto, means for moving said arm members relative to one another, and a U-shaped cushion member having its side arms attached to the adjacent faces of said arm members.

2. As a new article of manufacture, a clamping device of the class described comprising in combination, a support, a pair of relatively movable and substantially parallel arm members attached thereto, means for moving said arm members relative to one another, and a U-shaped cushion member having its side arms attached to the adjacent faces of said arm members, said cushion member consisting of an integral strip of sponge rubber.

3. A device for carrying fish rods and the like comprising in combination, a support, a clamping structure attached thereto including a pair of relatively yieldable and relatively movable substantially parallel arm members having upper free end portions and lower end portions adapted to engage opposite sides of the eaves-trough of an automobile and means associated with said arm members for moving them towards and away from one another, said support including a yieldable member for bearing on an automobile body adjacent the said eaves-trough thereof, and cushion means including a yieldable member of sponge-rubber-like material secured to the adjacent inner faces of the upper free end portions of the arm members.

GEORGE F. FELTON.